Patented Jan. 1, 1935

1,986,260

UNITED STATES PATENT OFFICE 1,986,260

HYDRAULIC PRESSURE TRANSMITTING FLUID

Robert R. Fulton, Pittsburgh, Pa., assignor to Puritan Soap Company, Rochester, N. Y., a corporation of New York No Drawing. Application February 9, 1933
Serial No. 656,037

5 Claims. (Cl. 252—5)

My present invention relates to hydraulics and more particularly to the fluid compositions used in hydraulic machinery for the transmission of pressures and hence of power and it has for its object to provide an improved fluid of this nature that will successfully meet, to a greater degree than heretofore, the many exactions peculiar to this particular branch of engineering imposed by the requirements of modern commercial practice. The improvements thus further relate in object to supplying a fluid of great chemical and physical stability that will behave with substantially uniform reactions under varying conditions when mechanically exercised in the machine parts with which they are associated and with which they combine in function.

To these and other ends, the invention resides in certain improvements and combinations of parts, all as will be hereinafter more fully described, the novel features being pointed out in the claims at the end of this specification.

The hydraulic machinery concerned, in which such damping fluids are used, covers the range of hydraulic brakes, hydraulic shock absorbers, hydraulic jacks, hydraulic presses, recoil chambers, dash pots, et cetera, but as the operating restrictions and requirements imposed are much the same but, in general, more severe with respect to hydraulic brakes as used in the automotive industry, I will, for convenience, confine my references herein to that field of usefulness. A description of such hydraulic brake systems need not, however, be given herein as they are completely explained in the service manuals of the many motor cars using them and anyone interested in hydraulic fluids will be familiar with their general construction and understand the terms used in referring to them in this specification. Suffice it to say that the working cylinders thereof, in which the fluid is pumped or pressed to forcibly move the brake shoes into engagement with their drums, involve the use of both metals and rubber cups or packings which are exposed to the fluid and have working frictional contact surfaces which, if lubricated at all, must be so lubricated through the medium of the fluid itself. Because of their environment, that is, their outdoor use, they must remain serviceable and rendered dependable under all sorts of weather or atmospheric conditions involving extreme changes especially with respect to temperature, which latter under running conditions varies from summer heat in one locality or season to zero and below in other localities and seasons.

It follows from the foregoing that a satisfactory and successful brake fluid must meet a number of varied conditions and remain unchanged in its capabilities and actions, physically, chemically and mechanically. Its viscosity through the range of working temperatures should remain within reasonably restricted margins; it must not crystallize or solidify at low temperatures; it should in fact remain fluid at temperatures as low as —60° F. if its capabilities and usefulness are not to be seriously impaired; it must have and maintain just the proper viscosity or state of fluidity to permit it to flow readily to the remotest parts of the brake system, and while transmitting pressure without perceptible friction or resistance it must not be sufficiently penetrating to permit leakage between working surfaces, as for instance, the wheel-cylinder walls and the rubber plunger cups; it must lubricate the rubber and metal working surfaces; it must be non-corrosive and without deleterious effect upon either of these materials; it should not evaporate, volatilize, separate, or change its physical or chemical structure at high temperatures, or the temperatures to which it may be subjected while in use in the hydraulic brake systems of pleasure cars or the more severe conditions prevalent in motor buses and trucks; it should preferably be cheaply available for extensive commercial use.

I have discovered that a substance commercially known as "carbitol" and available as such inexpensively in quantity on the current market, when used as a hydraulic brake fluid or as the principal ingredient thereof, meets all of these conditions in a most satisfactory manner. The technical name thereof is monoethyl ether of diethylene glycol, having the chemical formula $CH_2OH.CH_2OCH_2.CH_2OC_2H_5$. It is a colorless, not over odorous, chemically inert (at least, in the prescribed environment) and non-inflammable liquid. I prefer to use therewith, for the purposes in hand, a quantity of glycerine such that the resulting fluid mixture will have a viscosity at 100° F. of not less than 60 nor more than 100 seconds Saybolt. I do not, however, wish to be limited to proportions of glycerine and "carbitol" which will yield viscosities within the above range, but desire to protect by Letters Patent a solution, the outward characteristics of which are unchanged but which behaves in some respects to better advantage than the carbitol alone. Viscosity determinations, on my preferred fluid, through the range of probable working temperatures give the following results in Saybolt seconds:

| 100° F. | 60° F. | 32° F. | 0° F. |
|---|---|---|---|
| 76 | 205 | 495 | 1962 |

Such solution is stable in composition and does not deteriorate with age or under severe service conditions; it will not cause rubber to soften or swell nor corrode any of the metal parts of the brake system with which it comes in contact, but, on the other hand, acts as a lubricant for friction surfaces of both materials; it has a relatively small coefficient of expansion; its vapor pressure is low, the boiling point of carbitol being about 390° F. and that of glycerine 554° F., so that it will not evaporate at a rate that makes frequent replacement of liquid in the brake system necessary or become too viscous or gummy from such a cause, and the components have no tendency to react with each other in such manner that the chemical and physical characteristics of the fluid are adversely altered.

I have also discovered that a fluid having a still more narrow viscosity range between 100° F. and 0° F. can be prepared by the addition to carbitol of suitable amounts of the triethanolamine soaps of acetic, lactic, oleic, lauric, palmitic acids, or mixtures of two or more of these, such as the mixture of fatty acids derived from cocoanut oil. The above by no means exhaust the list of organic acids suitable, as will be apparent to one skilled in the art.

The following mixture for example makes an excellent brake fluid:

| | Parts by weight |
|---|---|
| Carbitol | 200 |
| Triethanolamine lactate | 80 | or

| | Parts by weight |
|---|---|
| Carbitol | 100 |
| Triethanolamine | 20 |
| Cocoanut oil fatty acids | 25 |

I have further discovered that certain esters of organic acids, such for example as triacetin, triethyl citrate, methyl lævulinate and ethyl lævulinate have properties which render them suitable for use, in combination with carbitol, as fluids for hydraulic brake systems. Such esters of organic acids may conceivably be used alone where conditions make it practicable, but in the case of triethyl citrate it is preferred to combine it with suitable proportions of carbitol to obtain a fluid having just the proper viscosity range between 100° and 0° Fahrenheit.

The above fluid mixtures, as well as those heretofore mentioned, possess to a high degree all of the properties requisite for hydraulic pressure transmitting liquids, being particularly suitable for hydraulic brake systems.

I claim as my invention:

1. A fluid for use in the transmission of hydraulic pressure, as described, consisting of monoethyl ether of diethylene glycol in solution with a triethanolamine salt of an organic acid.

2. A fluid for use in the transmission of hydraulic pressure, as described, consisting of monoethyl ether of diethylene glycol with a soap composed of the fatty acids of cocoanut oil in combination with triethanolamine.

3. A fluid for use in the transmission of hydraulic pressure, as described, consisting of monoethyl ether of diethylene glycol in combination with triethyl citrate.

4. A fluid for use in the transmission of hydraulic pressure, as described, consisting of monoethyl ether of diethylene glycol in combination with triacetin.

5. A fluid for use in the transmission of hydraulic pressure, as described, consisting of monoethyl ether or diethylene glycol in combination with an ester of organic acids selected from the group consisting of triacetin, triethyl citrate, methyl lævulinate and ethyl lævulinate.

ROBERT R. FULTON.